US012496693B2

(12) United States Patent
Schroeder et al.

(10) Patent No.: US 12,496,693 B2
(45) Date of Patent: Dec. 16, 2025

(54) FLYWHEEL DRIVEN FASTENING TOOL

(71) Applicant: BLACK & DECKER INC., New Britain, CT (US)

(72) Inventors: James D. Schroeder, Dallastown, PA (US); Qiang J. Zhang, Lutherville, MD (US); Matthew Miller, New Britain, CT (US); Daryl S. Meredith, York, PA (US)

(73) Assignee: Black & Decker Inc., New Britain, CT (US)

( * ) Notice: Subject to any disclaimer, the term of this patent is extended or adjusted under 35 U.S.C. 154(b) by 231 days.

(21) Appl. No.: 17/621,080

(22) PCT Filed: Dec. 22, 2020

(86) PCT No.: PCT/US2020/066568
§ 371 (c)(1),
(2) Date: Dec. 20, 2021

(87) PCT Pub. No.: WO2021/133781
PCT Pub. Date: Jul. 1, 2021

(65) Prior Publication Data

US 2022/0347826 A1 Nov. 3, 2022

Related U.S. Application Data

(60) Provisional application No. 62/955,674, filed on Dec. 31, 2019, provisional application No. 62/955,163,
(Continued)

(51) Int. Cl.
*B25C 1/06* (2006.01)

(52) U.S. Cl.
CPC .................................... *B25C 1/06* (2013.01)

(58) Field of Classification Search
CPC .... B25C 1/06; B25C 1/08; B25C 1/14; B25C 1/18; B25D 9/10; F02B 63/02; F01L 9/10
(Continued)

(56) References Cited

U.S. PATENT DOCUMENTS

| | | | | |
|---|---|---|---|---|
| 2,378,131 A * | 6/1945 | Dirksen | ................ | E04H 17/263 173/124 |
| 2,835,472 A * | 5/1958 | Osborn | ................... | E21B 7/046 175/218 |

(Continued)

FOREIGN PATENT DOCUMENTS

| | | | | |
|---|---|---|---|---|
| DE | 102013208300 A1 * | 11/2014 | ............... | B25C 1/06 |
| EP | 3323559 A1 | 5/2018 | | |

(Continued)

OTHER PUBLICATIONS

International Search Report and Written Opinion regarding International Application No. PCT/US2020/066568, dated Sep. 22, 2021.

*Primary Examiner* — Robert F Long
(74) *Attorney, Agent, or Firm* — Harness, Dickey & Pierce, P.L.C.

(57) ABSTRACT

A flywheel (34) can be mounted on a flywheel carriage (88) that can include a pair of axles (90). The flywheel carriage can be movable along two pairs of guide slots (42) of the tool frame between a disengaged position in which the flywheel is spaced from the fastener driver (26), and an engaged position in which the flywheel is engaged with the fastener driver to drive the fastener driver along a driver axis. A pair of pinch rollers (50) can be coupled to the tool frame and can be engageable with a pinch roller side of the driver profile that is opposite the flywheel side. A plane aligned with an axis of rotation of the flywheel and oriented perpendicular to the driver axis can be located between an axis of rotation of
(Continued)

each of the pair of pinch rollers throughout engagement of the flywheel with the fastener driver along the longitudinal flywheel engagement length.

37 Claims, 8 Drawing Sheets

Related U.S. Application Data filed on Dec. 30, 2019, provisional application No. 62/953,417, filed on Dec. 24, 2019.

(58) Field of Classification Search
USPC ..... 173/1–2, 13, 18–20, 184, 29–31, 38–39, 173/45–53, 90
See application file for complete search history.

(56) References Cited

U.S. PATENT DOCUMENTS 3,148,001 A * 9/1964 Johnson ................. B23D 59/02 173/188
3,173,315 A * 3/1965 Fuldner ................ G05B 19/373 91/170 R
3,415,343 A * 12/1968 Torbjorn ................. B66B 9/022 187/270
3,464,655 A * 9/1969 Schuman ............... B28D 1/041 74/89.17
3,549,002 A * 12/1970 Leach .................. B65G 47/261 198/781.08
4,046,204 A * 9/1977 Takaoka .................... E21B 4/02 175/76
4,121,702 A * 10/1978 Kaufmann ............... B61H 7/04 188/42
4,121,745 A 10/1978 Smith et al.
4,129,240 A 12/1978 Geist
4,161,272 A 7/1979 Brockl
4,189,080 A 2/1980 Smith et al.
4,234,155 A * 11/1980 Destree .................. F16M 11/24 173/190
4,250,973 A * 2/1981 Hall ........................ E21B 19/24 173/147
4,254,549 A * 3/1981 McMullin .............. H02G 1/005 30/251
4,308,946 A * 1/1982 Ouellette ............... B65G 13/07 198/814
4,323,127 A * 4/1982 Cunningham ............ B25C 1/06 124/78
4,417,681 A 11/1983 Bernecki et al.
4,530,454 A 7/1985 Gloor et al.
4,558,747 A * 12/1985 Cunningham ............ B25C 1/06 173/124
4,625,815 A * 12/1986 Spies ...................... E21B 19/22 173/147
4,648,325 A * 3/1987 Gutekunst ............. F16H 19/025 104/166
4,747,455 A * 5/1988 Cunningham ............ B25C 1/06 173/124
4,831,937 A * 5/1989 Yamada ................. A63G 21/04 104/246
4,887,390 A * 12/1989 Boyko .................. E05F 15/646 49/214
4,896,572 A * 1/1990 Smyth ................ B23Q 11/0046 83/100
4,964,558 A * 10/1990 Crutcher ................... B25C 1/06 173/124
5,098,004 A 3/1992 Kerrigan
5,134,789 A * 8/1992 Godau .................. D06B 21/00 34/636
5,222,439 A * 6/1993 Di Rosa .................. B61C 13/04 105/152
5,226,488 A * 7/1993 Lessard ................. E21B 19/084 173/147
5,381,943 A 1/1995 Allen et al.
5,564,615 A 10/1996 Bishop et al.
5,709,276 A * 1/1998 Lee ......................... E21B 7/046 175/122
5,944,144 A * 8/1999 Hein ......................... B66B 9/02 187/254
6,371,352 B1 4/2002 Mochizuki
6,669,072 B2 * 12/2003 Burke ....................... B25C 1/06 227/129
7,325,711 B2 2/2008 Schiestl et al.
7,325,712 B2 2/2008 Schiestl
7,410,085 B2 8/2008 Wolf et al.
7,500,589 B2 3/2009 Wolf et al.
7,506,788 B2 3/2009 Liang et al.
7,575,141 B1 8/2009 Liang et al.
7,575,142 B2 8/2009 Liang et al.
7,815,088 B2 * 10/2010 Fielitz ....................... B25C 1/06 227/129
7,870,988 B2 1/2011 Schiestl et al.
7,934,565 B2 5/2011 Krondorfer et al.
7,975,807 B2 * 7/2011 Franklin ................... E06C 7/12 187/241
7,997,467 B2 * 8/2011 Hirabayashi .............. B25C 1/06 227/156
8,136,606 B2 3/2012 Krondorfer et al.
8,162,073 B2 4/2012 Krondorfer et al.
8,240,534 B2 * 8/2012 Hirabayashi .............. B25C 1/06 227/132
8,479,966 B2 7/2013 Chien et al.
8,511,532 B2 8/2013 Chien et al.
8,550,323 B2 10/2013 Fujimoto
8,740,033 B2 6/2014 Li et al.
8,991,675 B2 3/2015 Liang et al.
9,399,281 B2 * 7/2016 Brendel .................... B25C 1/06
9,988,060 B2 * 6/2018 Slurink ................... B61B 13/04
10,022,848 B2 * 7/2018 Gross ........................ B25F 5/00
10,704,653 B2 * 7/2020 Almqvist ................ F16H 3/089
2004/0253064 A1 * 12/2004 Koslowski ............. B28D 1/041 408/1 R
2006/0180631 A1 * 8/2006 Pedicini .................... B25C 1/06 227/8
2006/0214463 A1 * 9/2006 Sahara ................... B60J 3/0204 296/97.4
2006/0261125 A1 * 11/2006 Schiestl .................... B25C 1/06 227/133
2006/0261126 A1 * 11/2006 Schiestl .................... B25C 1/06 227/133
2006/0261127 A1 * 11/2006 Wolf ......................... B25C 1/06 227/131
2007/0102471 A1 * 5/2007 Gross ........................ B25C 1/06 227/131
2009/0032566 A1 * 2/2009 Liang ........................ B25C 1/06 227/131
2009/0032567 A1 * 2/2009 Liang ........................ B25C 1/06 227/131
2009/0095787 A1 * 4/2009 Liang ........................ B25C 1/06 227/131
2009/0194573 A1 * 8/2009 Liang ........................ B25C 1/06 227/129
2009/0250500 A1 * 10/2009 Brendel .................... B25C 5/15 227/132
2009/0294504 A1 * 12/2009 Kunz ........................ B25C 1/06 227/8
2009/0314816 A1 * 12/2009 Schroeder ............ B21D 43/006 226/176
2009/0321495 A1 * 12/2009 Hirabayashi .............. B25C 1/06 227/156
2010/0038397 A1 * 2/2010 Krondorfer ............... B25C 1/06 227/8
2010/0065294 A1 * 3/2010 Hirabayashi .............. B25C 1/06 173/122
2011/0062208 A1 * 3/2011 Hlinka .................... B25C 1/008 227/8
2011/0135412 A1 * 6/2011 Duncan .................. B28D 1/041 408/72 R
2011/0259937 A1 * 10/2011 Chien ....................... B25C 1/06 227/120

(56) References Cited

U.S. PATENT DOCUMENTS

| | | | | |
|---|---|---|---|---|
| 2012/0074195 | A1 | 3/2012 | Chien et al. | |
| 2013/0153254 | A1 * | 6/2013 | Liang | B25D 11/00 173/114 |
| 2013/0189043 | A1 * | 7/2013 | Uchiuzo | B23Q 15/12 408/1 R |
| 2013/0255984 | A1 | 10/2013 | Po | |
| 2014/0360330 | A1 * | 12/2014 | Casagranda | B23D 47/06 83/436.4 |
| 2017/0100828 | A1 | 4/2017 | Chien et al. | |
| 2019/0091844 | A1 * | 3/2019 | Akiba | B25C 1/008 |
| 2019/0148923 | A1 * | 5/2019 | King | H02G 1/081 254/134.3 R |
| 2019/0366527 | A1 * | 12/2019 | Akiba | B25C 5/15 |
| 2020/0016732 | A1 * | 1/2020 | Schmidt | B25C 1/06 |
| 2020/0061789 | A1 | 2/2020 | Dittrich et al. | |
| 2020/0276691 | A1 | 9/2020 | Akiba et al. | |
| 2021/0008701 | A1 * | 1/2021 | Tan | B25C 1/008 |
| 2021/0299835 | A1 * | 9/2021 | Ward | B25C 1/047 |
| 2021/0394346 | A1 * | 12/2021 | Okouchi | B25C 1/06 |

FOREIGN PATENT DOCUMENTS

| | | | | |
|---|---|---|---|---|
| JP | 2006346855 | A * | 12/2006 | B25C 1/06 |
| WO | WO-2015182605 | A1 * | 12/2015 | B25C 1/06 |
| WO | WO-2018005785 | A1 | 1/2018 | |
| WO | WO-2019087873 | A1 | 5/2019 | |

* cited by examiner

FLYWHEEL DRIVEN FASTENING TOOL

CROSS-REFERENCE TO RELATED APPLICATIONS

This application is the U.S. National Phase Application under 35 U.S.C. 371 of International Application No. PCT/US2020/066568 filed on Dec. 22, 2020 which claims the benefit of U.S. Provisional Application No. 62/953,417, filed on Dec. 24, 2019; U.S. Provisional Application No. 62/955,163, filed on Dec. 30, 2019; and U.S. Provisional Application No. 62/955,674, filed on Dec. 31, 2019. The entirety of each of the above applications is incorporated herein by reference.

FIELD

The present disclosure relates to a flywheel driven fastening tool, such as a cordless electric nailer; and more particularly, to a drive motor assembly, a pinch roller assembly, and a driver return assembly of such flywheel driven fastening tools.

BACKGROUND

This section provides background information related to the present disclosure which is not necessarily prior art.

Flywheel driven fastening tools typically include a rotating flywheel that engages a driver to impart energy to the driver, causing the driver to move and drive or deform the fastener. Thus, a drive motor assembly can include an electric motor coupled to the flywheel to rotate the flywheel without engaging the driver. When activated, the drive motor assembly causes the rotating flywheel and driver to engage each other to propel the driver from the returned position to the extended position. In a cordless electric nailer, for example, fasteners, such as nails, are driven into a workpiece by a driver blade or driver through a process known as a “drive” or “drive cycle”. Generally, a drive cycle involves the driver striking a fastener head during a drive stroke to an extended position and returning to a home or returned position during a return stroke. The structure of the drive motor assembly can result in changes in the attack angle or other changes that affect the efficiency with which the energy is transferred from the flywheel to the driver as the driver wears over the life of the tool.

Flywheel driven fastening tools can include a pinch roller positioned on the opposite side of the driver from the flywheel. The driver is sandwiched or pinched between the pinch roller and the flywheel to the transfer of energy from the flywheel to the driver. The pinch roller can permit flexing of the drive blade of the driver, resulting in detrimental oscillation of the fastener engaging end of the drive blade, as the driver moves along the drive path.

Flywheel driven fastening tools can include a driver return assembly. Typically, such driver return mechanisms include compression return springs mounted on guide rails along which the driver moves. These compression return springs are compressed during the drive stroke and operate to return the driver during the return stroke. Such compression return springs experience extremely high dynamic loading forces as the profile is accelerated and decelerated in driving a nail. For example, in some cases a driver profile can accelerate from zero to 23 meters per second in about 4 milliseconds. As a result, return springs of such a driver profile generate problematic surge velocity waves which are highly detrimental to a desired long fatigue life of the springs. In addition, the room that is required along the drive rails to accommodate the compressed spring at the end of the drive stroke, can limit the ability to shorten the length of the tool in the direction of the diver axis.

Accordingly, there remains a need to improve flywheel driven fastening tools to address the problems identified above or to address other problems of the drive motor assembly, the pinch roller, and the driver return assembly.

SUMMARY

This section provides a general summary of the disclosure, and is not a comprehensive disclosure of its full scope or all of its features.

In accordance with some aspects of the present disclosure a flywheel driven fastening tool can include a fastener driver drivable along a driver axis and a flywheel driven by an electric motor. The flywheel can be mounted on a flywheel carriage, and the flywheel carriage can include a pair of axles. A tool frame can include two pairs of guide slots with opposite ends of each of the pair of axles positioned within the two pairs of guide slots. The flywheel carriage can be movable along the two pairs of guide slots between a disengaged position in which the flywheel is spaced from the fastener driver, and an engaged position in which the flywheel is engaged with the fastener driver to drive the fastener driver along a driver axis.

At least engagement ends of the two pairs of guide slots can extend linearly, and can be aligned with each other in a common plane. The two pairs of guide slots can extend linearly and can be aligned with each other in a common plane to guide each of the pair of axles of the flywheel carriage along the common plane as the flywheel carriage moves between the engaged position and the disengaged position. The common plane can extend at an acute angle relative to the driver axis that is between 10 and 25 degrees.

A bearing can be mounted on the opposite ends of each of the pair of axles. The bearing can rotate as the flywheel carriage moves along the two pairs of guide slots between the engaged position and the disengaged position.

The flywheel drive fastening tool can include a nosepiece assembly having a fastener discharge opening. The flywheel can be positioned closer to a fastener discharge opening of the nosepiece assembly and can be spaced from the fastener driver in the disengaged position. The flywheel can be positioned farther from the fastener discharge opening and in contact with the fastener driver in the engaged position.

The flywheel carriage can carry a permanent magnet that is operable to retain the flywheel carriage in the disengaged position. An electromagnetic actuator can be operable to move the flywheel carriage along the two pairs of guide slots between the engaged position and the disengaged position. The electromagnetic actuator can include a permanent magnet mounted on the flywheel carriage and an electromagnet. The electromagnet can have an activated state in which the permanent magnet is repelled by the electromagnet to move the flywheel carriage from the disengaged position to the engaged position along the two pairs of guide slots. The electromagnet can have an inactive state in which the permanent magnet is attracted to a core of the electromagnet to retain the flywheel carriage in the disengaged position along the two pairs of guide slots.

Both the flywheel and the electric motor can be mounted on the flywheel carriage. The flywheel and electric motor can be provided as a flywheel engine in which the flywheel and electric motor are integrated together into a single unit that is mounted on the flywheel carriage. The flywheel engine can include a brushless motor with an outer rotor, and the outer rotor of the brushless motor can include the flywheel.

In accordance with some aspects of the present disclosure a flywheel driven fastening tool can include a fastener driver drivable along a driver axis. The fastener driver can include a driver profile and a driver blade. A flywheel can be coupled to a tool frame and driven by an electric motor. The flywheel can be engageable with a flywheel side of the driver profile along a longitudinal flywheel engagement length. A pair of pinch rollers can be coupled to the tool frame and can be engageable with a pinch roller side of the driver profile that is opposite the flywheel side along a longitudinal roller engagement length of the pinch roller side of the driver profile. A plane aligned with an axis of rotation of the flywheel and oriented perpendicular to the driver axis can be located between an axis of rotation of each of the pair of pinch rollers throughout engagement of the flywheel with the fastener driver along the longitudinal flywheel engagement length.

The axes of rotation of the pair of pinch rollers can be spaced a longitudinal distance from each other that is 35% or less of the longitudinal flywheel engagement length of the driver profile.

The flywheel side of the driver profile can have a flywheel engaging surface profile that is uniform along the longitudinal flywheel engagement length. The pinch roller side of the driver profile can have a roller engaging surface profile that is uniform along the longitudinal roller engagement length. The axis of rotation of each of the pair of pinch rollers can be fixedly positioned with respect to the tool frame. The pair of pinch rollers are mounted on a roller carriage that is coupled to the tool frame. The roller carriage can be fixedly positioned relative to the tool frame.

In accordance with some aspects of the present disclosure, the flywheel driven fastening tool can have a driver return assembly that can include a pivoting linkage that is pivotably coupled to the tool frame at a first end of the pivoting linkage. The pivoting linkage can be coupled to the fastener driver at a second end of the pivoting linkage. The second end is opposite the first end of the pivoting linkage. A spring can have a fixed spring end coupled to the tool frame and a moving spring end coupled to the pivoting linkage.

The spring can be a torsion spring. The torsion spring can be positioned around a spring axis, and the pivoting linkage can be coupled to the tool frame to pivot at the spring axis. The spring can be an expansion spring.

The pivoting linkage can include a first link arm pivotably coupled to a second link arm. The first end of the pivoting linkage can be a proximal end of the first link arm, and the second end of the pivoting linkage can be a distal end of the second link arm.

The second end of the pivoting linkage can include an elongated slot. A pin of the fastener driver can extend into the elongated slot to couple the second end of the pivoting linkage to the fastener driver. The pivoting linkage can include a single pivot arm having both the first end and the second end of the pivoting linkage.

In accordance with some aspects of the present disclosure, the flywheel driven fastening tool can be an electric cordless fastening tool. including a battery that can be mounted to a tool housing of the flywheel driven fastening tool and electrically coupled to the electric motor. The electric cordless fastening tool can be an electric cordless nailer, and the fastener driver can be a nail driver.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, including when the corresponding parts are not identical.

DETAILED DESCRIPTION

Figure 1:
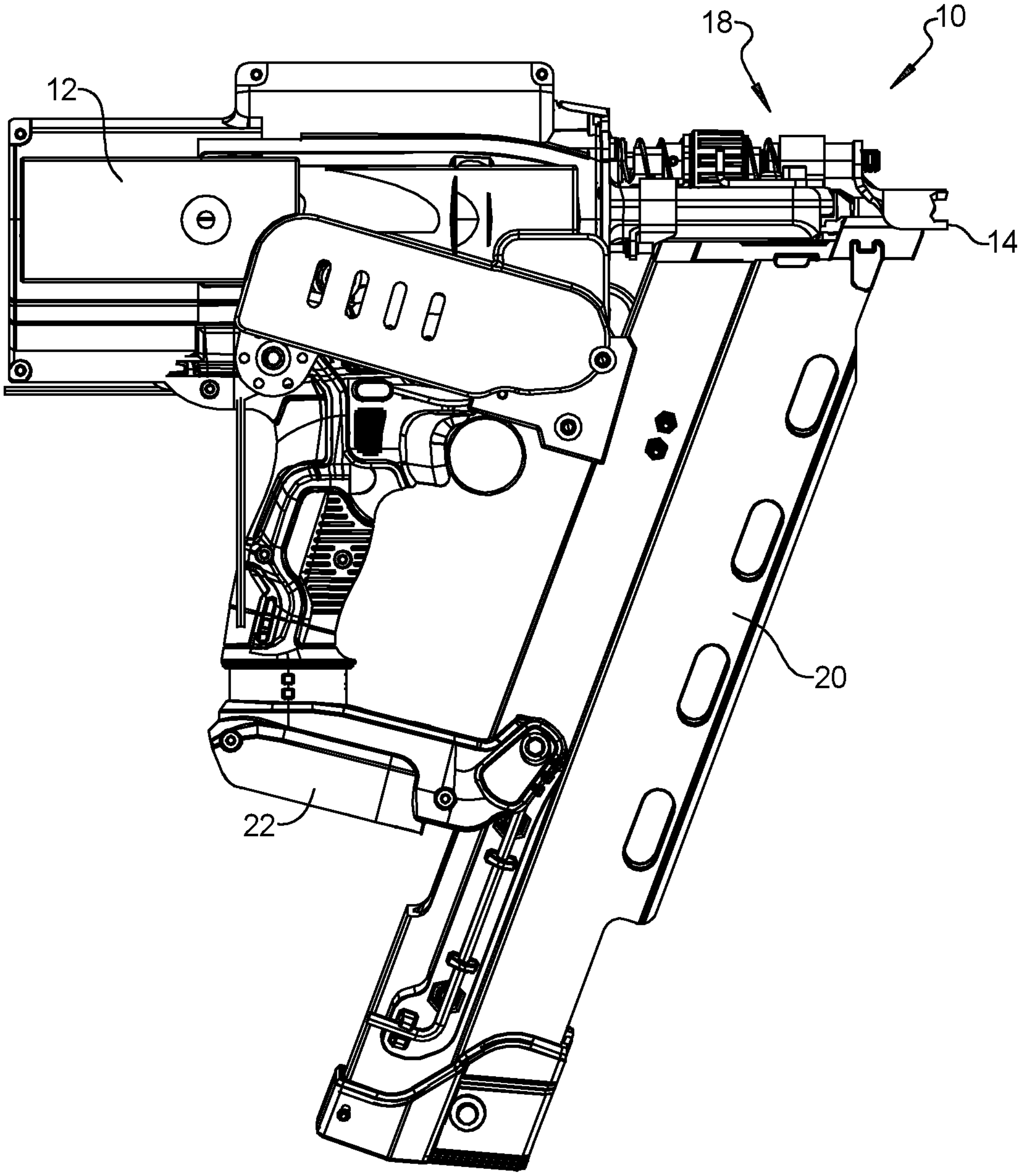
FIG. 1 is a side elevation view of one example flywheel driven fastening tool in accordance with aspects of the present disclosure.

Example embodiments will now be described more fully with reference to the accompanying drawings.

With reference to FIGS. 1-6, one example of a flywheel driven fastening tool 10 in the form of a cordless nailer in accordance with the present disclosure is illustrated and described. The cordless nailer 10 can include a housing assembly 12, a frame 40, a control unit 28, a drive motor assembly 16, a nosepiece assembly 18, a magazine assembly 20, and a battery pack 22. The housing assembly 12 can shroud all or portions of the frame 40. The frame 40 can serve as a structure or foundation to which various components can be mounted. The housing assembly 12, the control unit 28, the nosepiece assembly 18, the magazine assembly 20, and the battery pack 22 can be constructed and operated to drive a fastener, such as a nail.

The drive motor assembly 16 can include a drive source 24, which includes a motor 32 and a flywheel 34. As in the illustrated example, the drive source 24 can comprise the motor 32 and the flywheel 34 being integrated together into a single unit to form a flywheel engine 64. In an example flywheel engine 64, the motor 32 can be an outer rotor brushless motor 32 with the flywheel 34 being an integral part of the outer rotor of the motor 32. Alternatively, the drive source 24 can comprise separate motor 32 and flywheel 34 units, for example, where the motor 32 drives the flywheel 34 via a transmission (not shown) between the two separate units 32, 34. The drive motor assembly 16 can additionally include an electromagnetic actuator 30.

In operation, fasteners, such as nails, are stored in the magazine assembly 20, which sequentially feeds the fasteners into the nosepiece assembly 18. The drive motor assembly 16 is operable to drive a driver 26 along a driver axis 38 aligned in a longitudinal direction of the driver 26. The drive motor assembly 16 can be actuated by the control unit 28 to cause the driver 26 to translate along the driver axis 38 and impact a fastener in the nosepiece assembly 18. The nosepiece assembly 18 guides the fastener as it is driven from the fastening tool 10 through a fastener discharge opening 14 of the nosepiece assembly 18 and into a workpiece.

The drive source 24 and an electromagnetic actuator 30 including an electromagnet 58 of the drive motor assembly 16 can be electrically driven. For example, electrical energy supplied from the battery pack 22 can be used to operate the motor 32 and the electromagnetic actuator 30. The motor 32 is employed to drive the flywheel 34 so that energy may be transferred from the flywheel 34 to the driver 26 upon actuation of the electromagnetic actuator 30 to cause the driver 26 to translate along the driver axis 38 from a home or returned position (e.g., FIG. 4) to an extended position (e.g., FIG. 5).

The flywheel 34, such as one provided by a flywheel engine 64, can be mounted to a sliding flywheel carriage 88. The flywheel 34 or flywheel engine 64 can be mounted between a pair of parallel axles 90 that form a portion of the sliding flywheel carriage 88. Opposite ends of the axles 90 can include at least one bearing 92 or wheel. For example, opposite ends of each of the axles 90 can have a bearing or wheel 92 mounted thereon.

The fastening tool 10 includes a frame 40 and the frame can include a plurality of carriage guide slots 42. As in the illustrated example, the guide slots 42 can extend through portions of the frame 40. Alternatively, the carriage guide slots 42 can be provided by the frame 40 without extending completely through relevant portions of the frame 40. As in the illustrated example, the frame 40 can include two pairs of guide slots 42 with opposite ends of the each of the pair of axles 90 received in one of the pair of guide slots 42.

The guide slots 42 can have a disengaged end 44 and an engaged end 46. When the axles 90 of the flywheel carriage 88 are positioned along the guide slots 42 at the disengaged end 44, the carriage 88 and the flywheel 34 can be in a disengaged position in which the flywheel is spaced from the driver 26. When the axles 90 of flywheel carriage 88 are positioned along the guide slots 42 at the engaged end 46, the flywheel carriage 88 and the flywheel 34 can be in an engaged position in which the flywheel 34 is engaged with the driver 26. The engaged end 46 of the guide slots 42, and the flywheel carriage 88 and the flywheel 34 in the engaged position, can be positioned further from the fastener discharge opening 14 of the nosepiece assembly 18 than the disengaged end 44 of the guide slots 42, and the flywheel carriage 88 and flywheel 34 in the engaged position and vice versa.

As in the illustrated example, the carriage guide slots 42 can extend linearly and can be aligned with each other. In alternative examples, the guide slots 42 can have an arcuate shape, can be misaligned with each other, or both. In some cases where the guide slots 42 have an arcuate shape, the engaged end 46 of the guide slots 42 can extend linearly and can be aligned with each other. The flywheel carriage 88 can slide along the guide slots 42 between an engaged position (e.g., FIG. 5) toward the engaged end 46 of the guide slots 42 in which the flywheel 34 is engaged with the driver 26, and a disengaged position (e.g., FIG. 4) toward the disengaged end 44 of the guide slots 42 in which the flywheel 34 or flywheel engine 64 is disengaged, or spaced from the driver 26. This engaged position arrangement results in the action of the spinning flywheel 34 engaging against the driver 26 generating a force that acts on the flywheel carriage 88 in the direction of the engaged end 46 of the guide slots 42.

The guide slots 42 can operate as ramps that enable the flywheel 34 to be wedged against the driver 26 when the flywheel carriage 88 is slid to the engaged position along the guide slots 42. The engaged end 46 or the entirety of the guide slots 42 can extend at an acute angle relative to the driver axis 38. In some cases, this acute angle can be between 10 degrees and 25 degrees. In some cases, this acute angle can be between 15 degrees and 20 degrees; and in some cases, this acute angle can be 18 degrees. This angle can also be referred to as the attack angle at which the flywheel 34 engages the driver 26.

The electromagnetic actuator 30 of the drive motor assembly 16 can operate to move the flywheel carriage 88 and flywheel 34 along the guide slots 42 between their respective engaged positions and disengaged positions. As in the illustrated embodiment, the electromagnetic actuator 30 can include a permanent magnet 56 carried by the flywheel carriage 88. When the electromagnetic actuator 30 is not energized the permanent magnet 56 is in an inactive state, and the permanent magnet 56 can be attracted to the coil of the electromagnet 58 of the electromagnetic actuator 30 to retain the flywheel carriage 88 and flywheel 34 in their respective disengaged positions along the guide slots 42. When the electromagnetic actuator 30 is energized the electromagnet 56 is in an activated state, and the electromagnet 58 of the electromagnetic actuator 30 can repel the permanent magnet 56 to drive the carriage 88 and the flywheel 34 into their respective engaged positions along the guide slots 42.

Alternatively, the electromagnetic actuator 30 of the drive motor assembly 16 can include a reciprocating rod (not shown), such as a solenoid that is coupled to the flywheel carriage 88 to move the flywheel carriage 88 and flywheel 34 between their respective engaged and disengaged positions along the guide slots 42.

Generally, in response to appropriate signals, the control unit 28 can be configured to energize the motor 32, causing the flywheel 34 to rotate, and when the flywheel 34 is rotating at its firing speed, to energize the electromagnetic actuator 30 to drive the carriage 88 and flywheel 34, such as provided by a flywheel engine 64, from their respective disengaged to engaged positions along the guide slots 42. In these engaged positions, the flywheel 34 engages the driver 26 to drive the driver 26 along the driver axis 38 and causing the driver 26 to engage and drive a fastener from the tool 10 through the discharge opening 14 and into a workpiece (not shown).

The driver 26 can include a driver profile 52 and a driver blade 54. The flywheel 34 can engage the driver 26 along a flywheel side of the driver profile 52. The flywheel 34, such as one provided by a flywheel engine 64, can have outer circumferential grooves 36 that mate with cooperating axial or longitudinal grooves 48 along the flywheel side of the driver profile 52. The cooperating or longitudinal grooves of the flywheel side of the driver profile 52 define a flywheel engaging surface profile that is uniform along the longitudinal flywheel engagement length of the driver 26. For example, the flywheel engaging surface profile does not vary or ramp up and down along the longitudinal flywheel engagement length of the driver 26. These cooperating grooves 36, 48 increase the frictional contact area between the flywheel 34 and the driver 26. The driver blade 54 engages and drives the fastener, such as a nail, from the tool 10 as the driver 26 moves along the driver axis 38 toward the discharge opening 14.

As in this example, the flywheel driven fastening tool 10 can include a pair of pinch rollers 50 coupled to the frame 40. The pinch rollers 50 can be part of a roller assembly 60 that includes a roller bracket or carriage 62, which can be coupled to the frame 40. The pinch rollers 50, roller carriage 62, and the roller assembly 60 can be coupled to the frame 40 in a fixed position relative to the frame 40. Alternatively, the pinch rollers 50 can be pivotable or slidable relative to the frame 40 toward and away from the driver 26.

The pinch rollers 50 can be positioned on a pinch roller side of the driver profile 52, which pinch roller side is opposite the flywheel side of the driver profile 52. As a result, the driver profile 52 of the driver 26 can be disposed or sandwiched between the flywheel 34 and the pair of pinch rollers 50. As the carriage 88 and flywheel 34 move from their disengaged position to their engaged position, the flywheel 34 engages the driver profile 52 and pinches it between the flywheel 34 and the pinch rollers 50. Alternatively, the pinch rollers 50 can move relative to the frame 40 to an engaged position to pinch the driver profile 52 of the driver 26 against the flywheel 34, with or without movement of the flywheel 34 relative to the frame 40. The pinching action provided by the flywheel 34 and pinch rollers 50 facilitates efficient transfer of energy from the flywheel 34 to the driver 26.

The pinch roller side of the driver profile 52, can have a pinch roller engaging surface profile that is uniform along a longitudinal pinch roller engagement length thereof. For example, the flywheel engaging surface profile does not vary or ramp up and down along the longitudinal roller engagement length of the driver 26.

Figure 2:
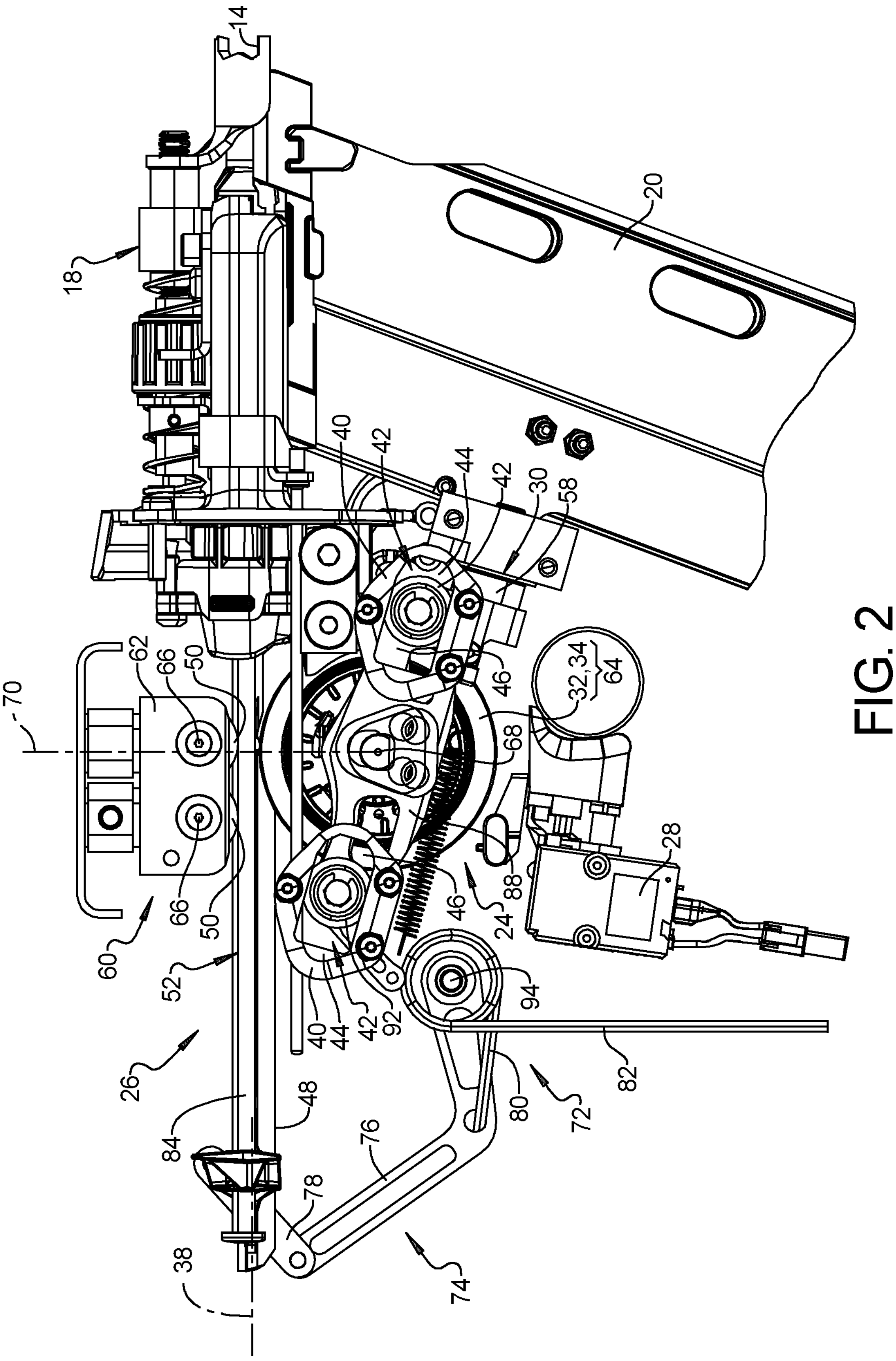
FIG. 2 is a side elevation view of various internal components of the flywheel driven fastening tool of FIG. 1, including an example drive motor assembly, an example pinch roller assembly, and an example driver return assembly in accordance with aspects of the present disclosure.
Figure 3:
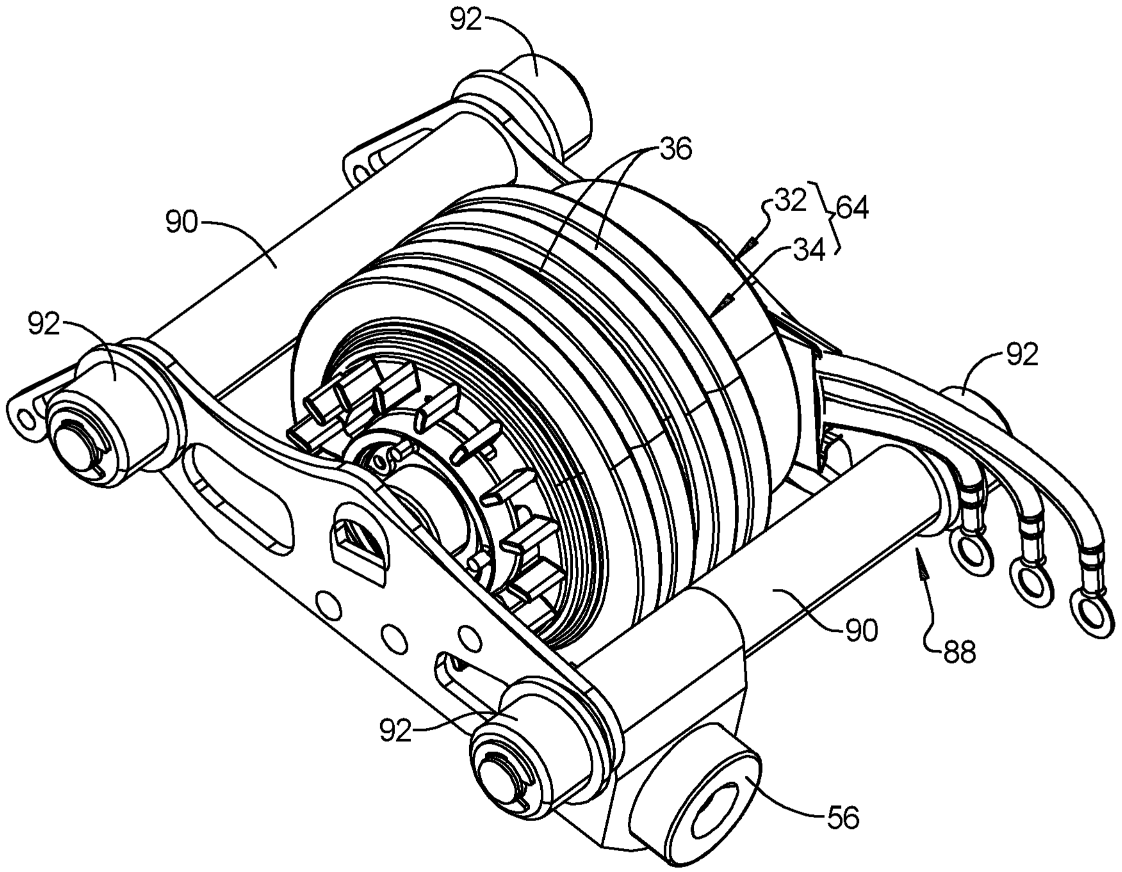
FIG. 3 is a perspective view of components of the example drive motor assembly of FIG. 2, including the flywheel carriage.
Figure 4:
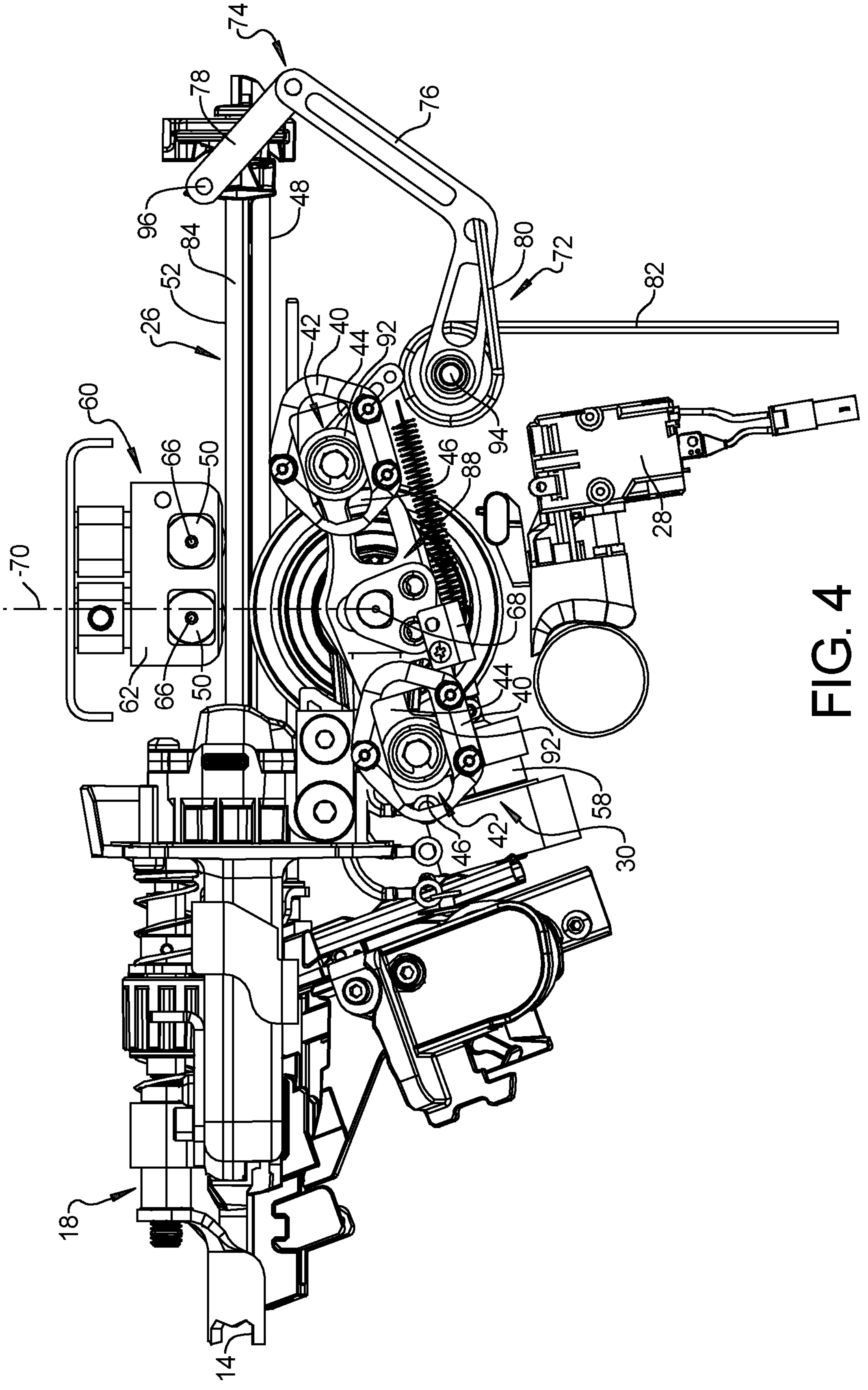
FIG. 4 is a side elevation view of the components of FIG. 2 with the example drive motor assembly in a disengaged position spaced from the driver, and with the driver and driver return assembly in a home or return position.
Figure 5:
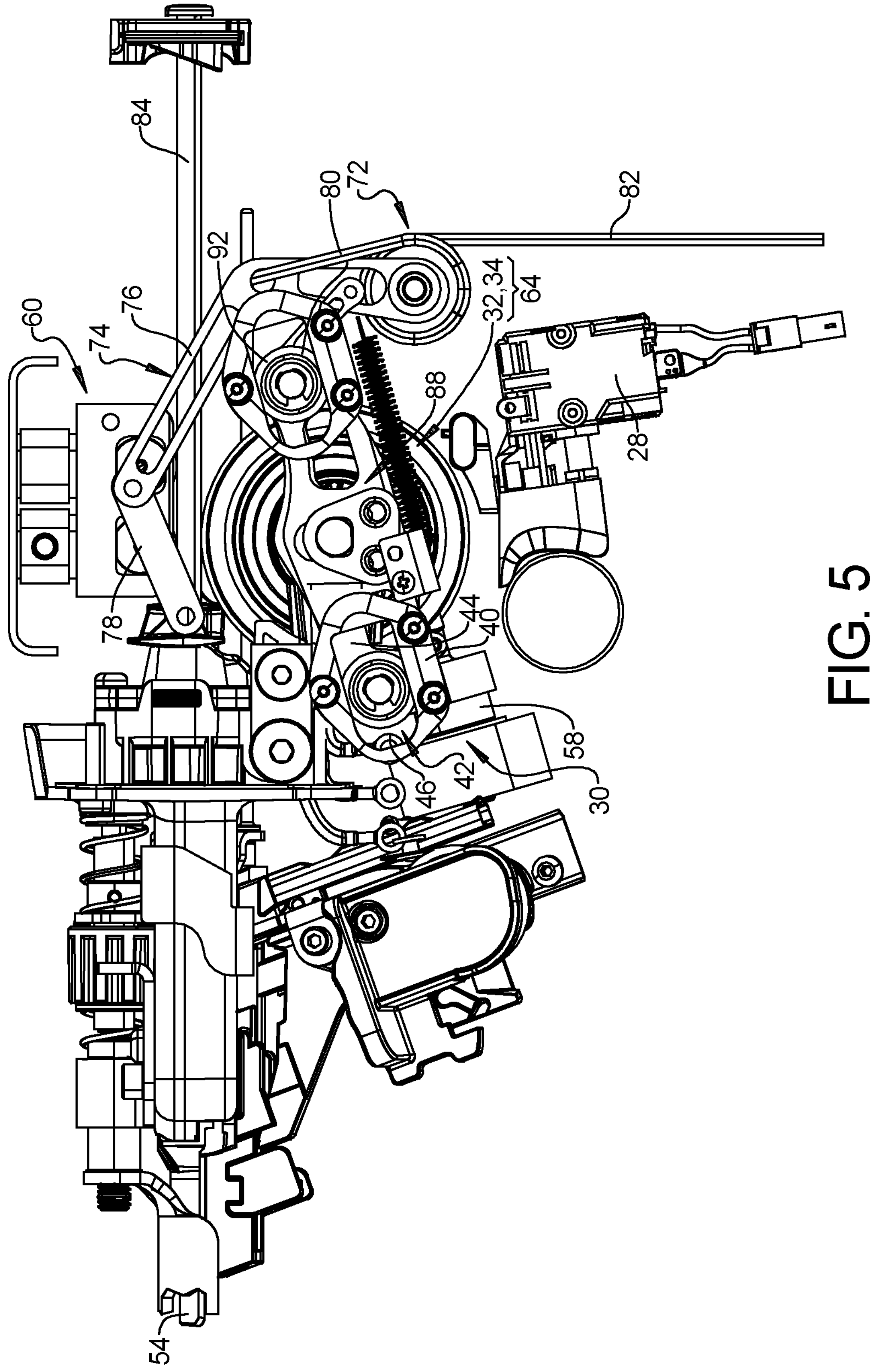
FIG. 5 is a side elevation view similar to FIG. 4, but with the example drive motor assembly in an engaged position contacting the driver, and with the driver and driver return assembly in an extended position.
Figure 6:
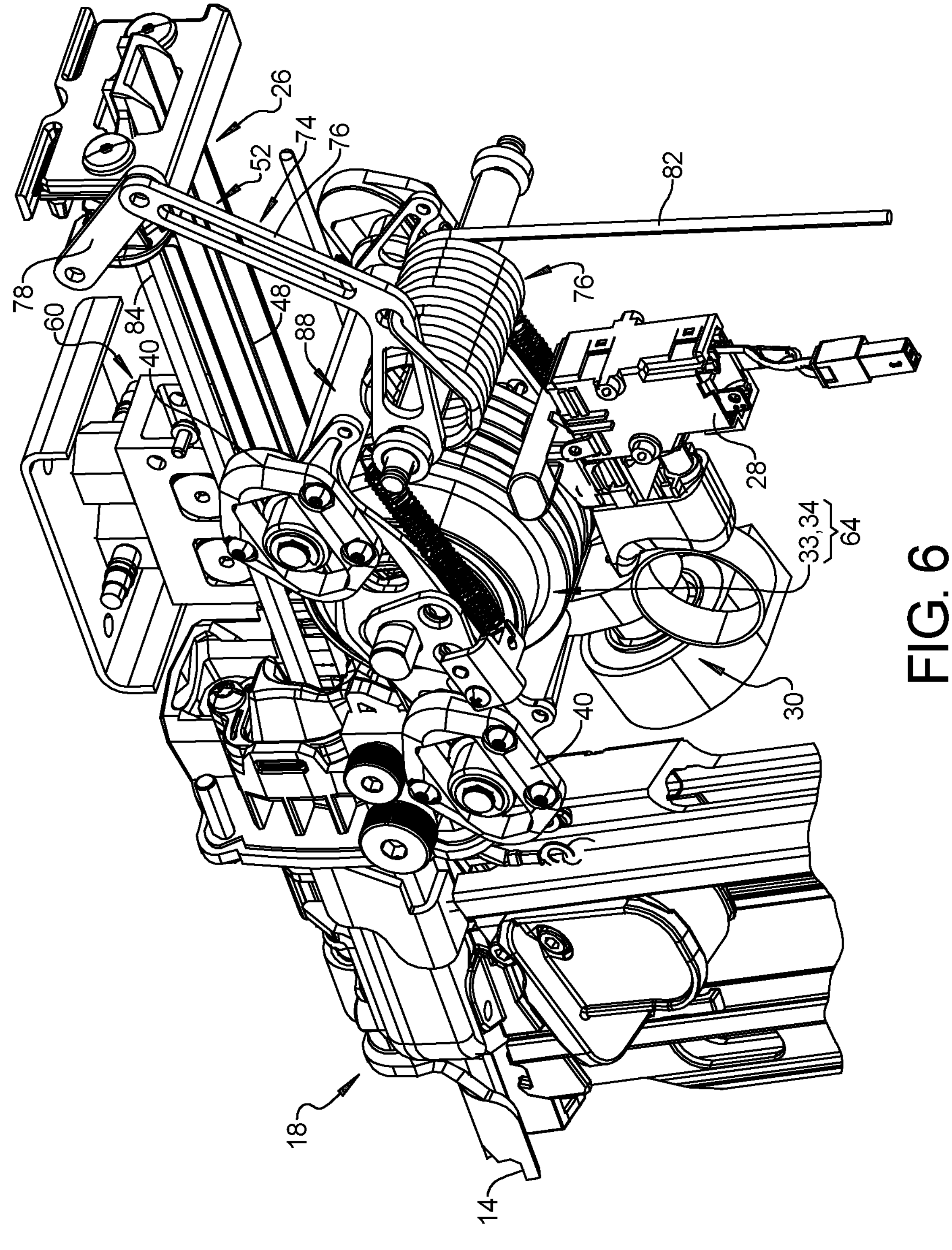
FIG. 6 is a perspective view of the various components of FIG. 2.

The pair of pinch rollers 50 each have a roller axis 66 about which each rotates and the flywheel 34 has a flywheel axis 68 about which it rotates. A plane 70 that extends along the flywheel axis 68 and that extends perpendicular to the driver axis 38 can be located between the roller axis 66 of each of the pair of pinch rollers 50 as shown in FIG. 2. In addition, the plane 70 can be located between and parallel to the pair of roller axes 66 of the pair of pinch rollers 50 throughout engagement of the flywheel 34 and the pinch rollers 50 with the driver 26. As a result of each roller axis of rotation 66 being on opposite sides of the plane 70 and of the flywheel axis 68, the pair of pinch rollers 50 operate to keep the driver 26 aligned with the driver axis 38 during its engagement with the flywheel 34 and pinch rollers 50, which in turn helps minimize unwanted flexing of the driver blade 54 of the driver 26.

In some cases, a distance between the pair of roller axes 66 can be 40% or less than a longitudinal engagement length of the driver profile 52. In some cases, the distance between the pair of roller axes 66 can be 30% or less than the longitudinal engagement length of the driver profile 52. In some cases, the distance between the pair of roller axes 66 can be 20% or less than the longitudinal engagement length of the driver profile 52. As used herein, the longitudinal engagement length of the driver profile 52 means the overall longitudinal length along which the flywheel 34 contacts the driver profile 52 during operation of the tool.

As in this example, the flywheel driven fastening tool 10 can include a driver return assembly 50 coupled to the frame 40. The driver return assembly 50 can include a spring 72 and a pivoting linkage 74 providing a coupling between the spring 72 and a trailing end of the driver 26. The driver 26 can be guided along the driver axis 38 by a pair of guide rails 84 as the driver 26 moves between an extended position (e.g., FIG. 5) and a return or home position (e.g., FIG. 4).

As in this example the spring 72 can be a torsion spring, and the pivoting linkage 74 can include two link arms 76, 78. For example, first link arm 76 can be pivotable about an axis 94 of the torsion spring 72 and can be coupled between the torsion spring 72 and a second link arm 78. The second link arm 78 can be pivotably coupled to and between the first link arm 76 and a trailing end of the driver profile 52 of the driver 26. A fixed spring end 82 can be fixedly coupled to the frame 40 and a moving spring end 80 can be coupled to the first link arm 76 to bias the pivoting linkage 74 and the driver 26 into their respective return or home positions. The first link arm 76 can have an L-shape or hockey stick shape, for example.

Figure 7A:
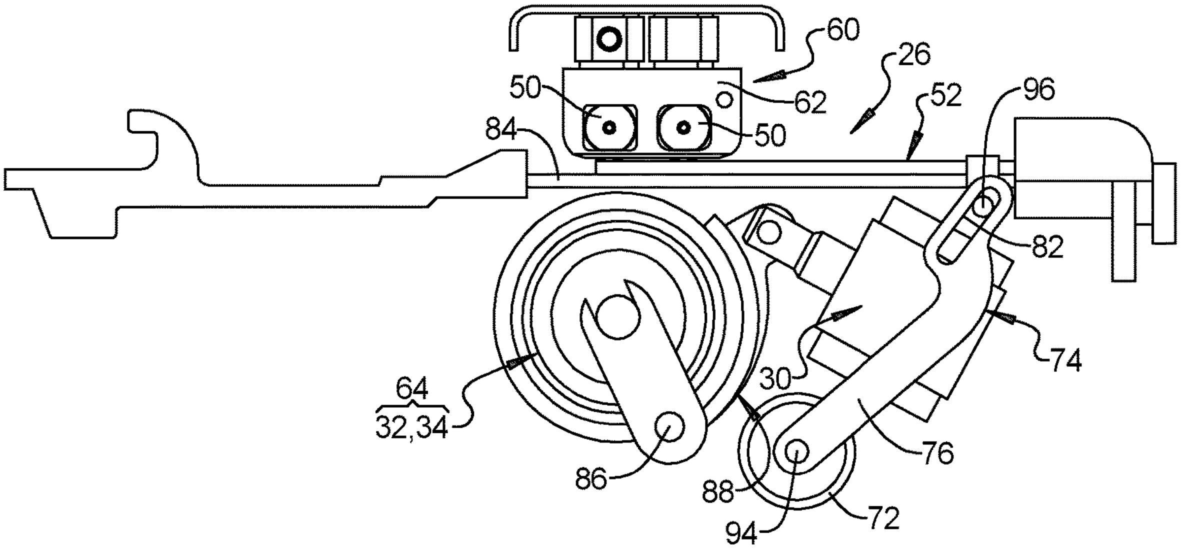
FIG. 7A is a side elevation view of another example drive motor assembly, and another example driver return assembly in accordance with aspects of the present disclosure, with the driver and example driver return assembly in a home or return position.
Figure 7B:
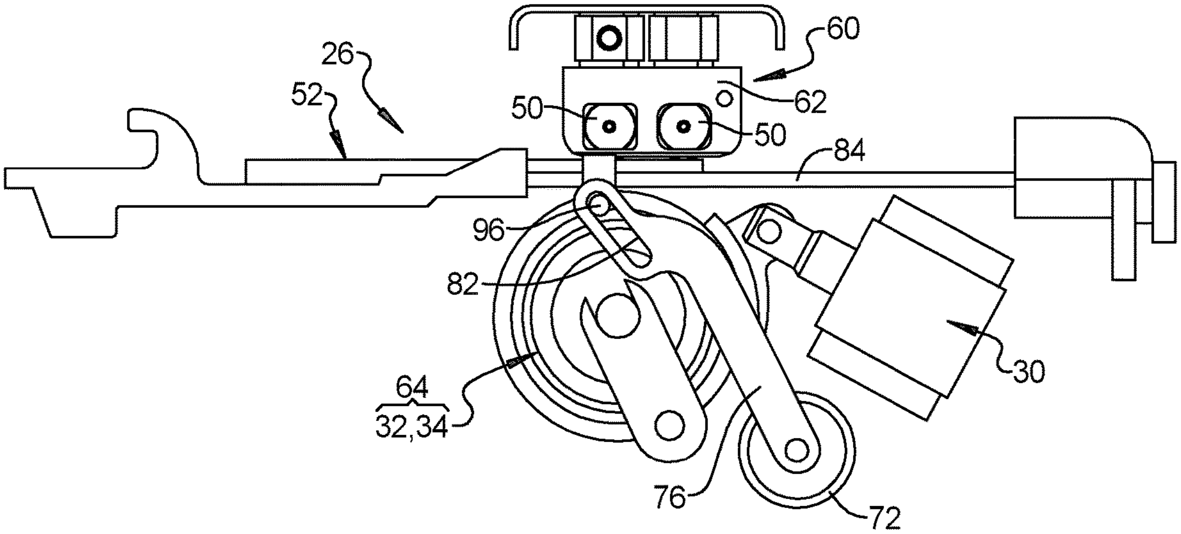
FIG. 7B is a side elevation view similar to FIG. 7A, but with the driver and this example driver return assembly in an extended position.

As in the example illustrated in FIGS. 7A and 7B, the pivoting linkage 74 can be a single link arm 76 that includes a slot 82 at one end through which a protruding pin 96 of the trailing end of the driver 26 is disposed. The single link arm 76 of the pivoting linkage 74 can be pivotable about an axis 94 of the torsion spring 72 with the moving spring end 80 coupled thereto. The slot 82 enables the pivoting motion of the single link arm 76 of the pivoting linkage 74 to be converted to the linear motion of the driver 26 along the guide rails 62 as the single link arm 76 of the pivoting linkage 74 pivots and the driver 26 moves along the driver axis 38.

Figure 8:
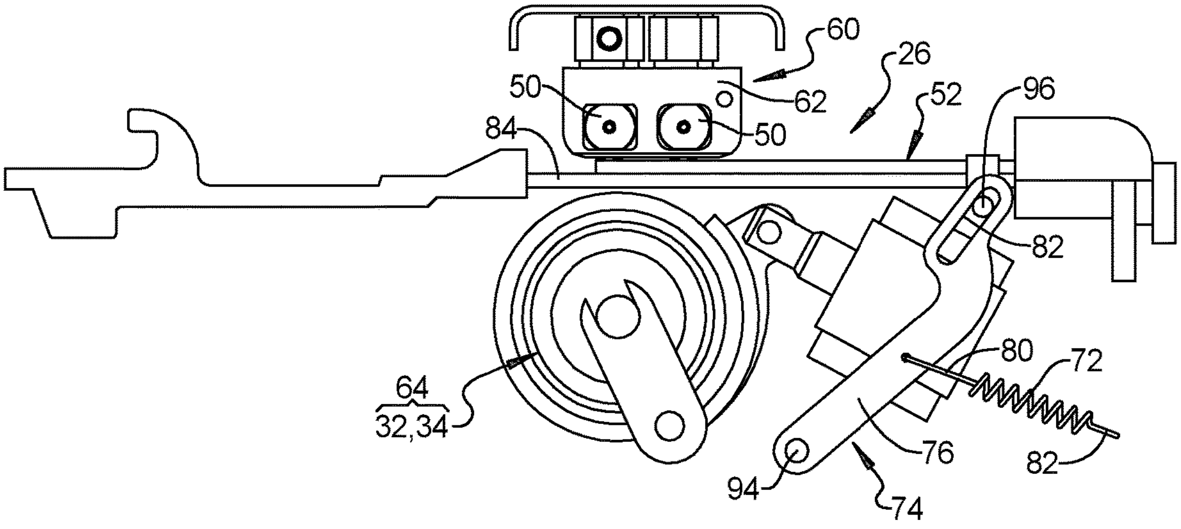
FIG. 8 is a side elevation view of yet another example driver return assembly in accordance with aspects of the present disclosure, with the driver and example driver return assembly in a home or return position.

As in the example illustrated in FIG. 8, the spring 72 can be an expansion spring. The expansion spring 72 can be coupled between the single link arm 76 of the pivoting linkage 74 and the frame 40.

As in the examples of FIGS. 7A, 7B, and 8, the flywheel carriage 88 can be a pivoting carriage 88, which pivots about a pivot axis 86. The actuator 30 can operate to pivot the carriage 88 clockwise (as oriented in FIGS. 7A, 7B, and 8) to bring the flywheel 34 into contact with the driver profile 52 of the driver 26.

With respect to an X, Y, Z three dimensional coordinate system and the example embodiments illustrated and described herein, the driver axis 38 and longitudinal direction of the driver 26 are each oriented or extend in the X direction. Each of the flywheel axis 68 of rotation, the roller axes 66 of rotation, the axis of rotation or central axis of the axles 90, the axis of rotation of the wheels or bearings 92, the axis 94 of the torsion spring 72, and a pivot axis 86 of the pivoting flywheel carriage 88 are oriented or extend in the Z direction, and the plane 70 is oriented or extends in the Z and Y directions.

As used herein, a “single pivot arm” means one and only one pivot arm. Although the single pivot arm can be made up of multiple parts, a single pivot arm does not include multiple arms or sections between its coupling ends that pivot relative to each other.

While the fastening tool is illustrated as being electrically powered by a suitable power supply or energy storage device, such as the battery pack, those skilled in the art will appreciate that the disclosure, in its broader aspects, may be constructed somewhat differently and that aspects of the present disclosure may have applicability to pneumatically powered fastening tools. Furthermore, while aspects of the present disclosure are described herein and illustrated in the accompanying drawings in the context of a fastening tool, those of ordinary skill in the art will appreciate that the disclosure, in its broadest aspects, has further applicability. For example, the drive motor assembly may also be employed in various other mechanisms that use reciprocating motion, including rotary hammers, hole forming tools, such as punches, and riveting tools, such as those that install deformation rivets.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, the mixing and matching of features, elements and/or functions between various examples and between the appended claims is expressly contemplated herein, even if not specifically shown or described, so that one of ordinary skill in the art would appreciate from this disclosure that features, elements and/or functions of one example or claim may be incorporated into another example or claim as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

What is claimed is:

1. A flywheel driven fastening tool configured to drive a fastener, the flywheel driven fastening tool comprising:

a fastener driver drivable along a driver axis;

a flywheel driven by an electric motor;

a flywheel carriage on which the flywheel is mounted, and the flywheel carriage including a pair of axles; and a tool frame including two pairs of guide slots with opposite ends of each of the pair of axles positioned within the two pairs of guide slots, wherein the flywheel carriage is movable along the two pairs of guide slots between a disengaged position in which the flywheel is spaced from the fastener driver and an engaged position in which the flywheel is engaged with the fastener driver to drive the fastener driver along the driver axis.

2. The flywheel driven fastening tool of claim 1, wherein at least engagement ends of the two pairs of guide slots extend linearly and are aligned with each other in a common plane.

3. The flywheel driven fastening tool of claim 2, wherein the common plane extends at an acute angle relative to the driver axis that is between 10 and 25 degrees.

4. The flywheel driven fastening tool of claim 1, wherein the two pairs of guide slots extends linearly and are aligned with each other in a common plane to guide each of the pair of axles of the flywheel carriage along the common plane as the flywheel carriage moves between the engaged position and the disengaged position.

5. The flywheel driven fastening tool of claim 4, wherein the common plane extends at an acute angle relative to the driver axis that is between 10 and 25 degrees.

6. The flywheel driven fastening tool of claim 1, wherein a bearing is mounted on the opposite ends of each of the pair of axles, and the bearing rotates as the flywheel carriage moves along the two pairs of guide slots between the engaged position and the disengaged position.

7. The flywheel driven fastening tool of claim 1, further comprising a nosepiece assembly including a fastener discharge opening, wherein the flywheel is positioned closer to a fastener discharge opening of the nosepiece assembly and spaced from the fastener driver in the disengaged position, and is positioned farther from the fastener discharge opening and in contact with the fastener driver in the engaged position.

8. The flywheel driven fastening tool of claim 1, wherein the flywheel carriage includes a permanent magnet that is operable to retain the flywheel carriage in the disengaged position.

9. The flywheel driven fastening tool of claim 1, further comprising an electromagnetic actuator that is operable to move the flywheel carriage along the two pairs of guide slots between the engaged position and the disengaged position.

10. The flywheel driven fastening tool of claim 9, wherein the electromagnetic actuator includes a permanent magnet mounted on the flywheel carriage and an electromagnet, and the electromagnet having an activated state in which the permanent magnet is repelled by the electromagnet to move the flywheel carriage from the disengaged position to the engaged position along the two pairs of guide slots.

11. The flywheel driven fastening tool of claim 10, wherein the electromagnet has an inactive state in which the permanent magnet is attracted to a core of the electromagnet to retain the flywheel carriage in the disengaged position along the two pairs of guide slots.

12. The flywheel driven fastening tool of claim 1, wherein the both the flywheel and the electric motor are mounted on the flywheel carriage.

13. The flywheel driven fastening tool of claim 1, wherein the flywheel and the electric motor are provided as a flywheel engine in which the flywheel and the electric motor are integrated together into a single unit that is mounted on the flywheel carriage.

14. The flywheel driven fastening tool of claim 13, wherein the flywheel engine comprises brushless motor with an outer rotor, and the outer rotor of the brushless motor includes the flywheel.

15. The flywheel driven fastening tool of claim 1, wherein the flywheel driven fastening tool is an electric cordless fastening tool, including a battery mounted to a tool housing and electrically coupled to the electric motor.

16. The flywheel driven fastening tool of claim 15, wherein the electric cordless fastening tool is an electric cordless nailer, and the fastener driver is a nail driver.

17. The flywheel driven fastening tool of claim 1, wherein the fastener driver includes a driver profile and a driver blade, and the flywheel is engageable with a flywheel side of the driver profile along a longitudinal flywheel engagement length, and the flywheel driven fastening tool further comprises:

a pair of pinch rollers coupled to the tool frame and engageable with a pinch roller side of the driver profile that is opposite the flywheel side along a longitudinal roller engagement length of the pinch roller side of the driver profile, wherein a plane aligned with an axis of rotation of the flywheel and oriented perpendicular to the driver axis is located between an axis of rotation of each of the pair of pinch rollers throughout engagement of the flywheel with the fastener driver along the longitudinal flywheel engagement length.

18. The flywheel driven fastening tool of claim 17, wherein the axis of rotation of each of the pair of pinch rollers are spaced a longitudinal distance from each other that is 35% or less of the longitudinal flywheel engagement length of the driver profile.

19. The flywheel driven fastening tool of claim 17, wherein the flywheel side of the driver profile has a flywheel engaging surface profile that is uniform along the longitudinal flywheel engagement length.

20. The flywheel driven fastening tool of claim 19, wherein the pinch roller side of the driver profile has a roller engaging surface profile that is uniform along the longitudinal roller engagement length.

21. The flywheel driven fastening tool of claim 17, wherein each the axis of rotation of each of the pair of pinch rollers is fixedly positioned with respect to the tool frame.

22. The flywheel driven fastening tool of claim 17, wherein the pair of pinch rollers are mounted to a roller carriage that is coupled to the tool frame.

23. The flywheel driven fastening tool of claim 22, wherein the roller carriage is fixedly positioned relative to the tool frame.

24. The flywheel driven fastening tool of claim 1, further comprising a driver return assembly including:

a pivoting linkage that is pivotably coupled to the tool frame at a first end of the pivoting linkage and that is coupled to the fastener driver at a second end of the pivoting linkage, and the second end is opposite the first end of the pivoting linkage; and a spring having a fixed spring end coupled to the tool frame and a moving spring end coupled to the pivoting linkage.

25. The flywheel driven fastening tool of claim 24, wherein the spring is a torsion spring.

26. The flywheel driven fastening tool of claim 25, wherein the torsion spring is positioned around a spring axis, and the pivoting linkage is coupled to the tool frame to pivot at the spring axis.

27. The flywheel driven fastening tool of claim 24, wherein the spring is an expansion spring.

28. The flywheel driven fastening tool of claim 24, wherein the pivoting linkage includes a first link arm pivotably coupled to a second link arm, and the first end of the pivoting linkage is a proximal end of the first link arm, and the second end of the pivoting linkage is a distal end of the second link arm.

29. The flywheel driven fastening tool of claim 24, wherein the second end of the pivoting linkage includes an elongated slot, and a pin of the fastener driver extends into the elongated slot to couple the second end of the pivoting linkage to the fastener driver.

30. The flywheel driven fastening tool of claim 29, wherein the pivoting linkage comprises a single pivot arm including both the first end and the second end of the pivoting linkage.

31. A flywheel driven fastening tool comprising:

a fastener driver drivable along a driver axis, the fastener driver including a driver profile and a driver blade;

a flywheel coupled to a tool frame and driven by an electric motor, and the flywheel being engageable with a flywheel side of the driver profile along a longitudinal flywheel engagement length;

a pair of pinch rollers coupled to the tool frame and being engageable with a pinch roller side of the driver profile that is opposite the flywheel side along a longitudinal roller engagement length of the pinch roller side of the driver profile, wherein a plane aligned with an axis of rotation of the flywheel and oriented perpendicular to the driver axis is located between an axis of rotation of each of the pair of pinch rollers throughout engagement of the flywheel with the fastener driver along the longitudinal flywheel engagement length; and a driver return assembly including:

a pivoting linkage that is pivotably coupled to the tool frame at a first end of the pivoting linkage and that is coupled to the fastener driver at a second end of the pivoting linkage, which second end is opposite the first end of the pivoting linkage; and a spring having a fixed spring end coupled to the tool frame and a moving spring end coupled to the pivoting linkage.

32. The flywheel driven fastening tool of claim 31, wherein the spring is a torsion spring.

33. The flywheel driven fastening tool of claim 32, wherein the torsion spring is positioned around a spring axis, and the pivoting linkage is coupled to the tool frame to pivot at the spring axis.

34. The flywheel driven fastening tool of claim 31, wherein the spring is an expansion spring.

35. The flywheel driven fastening tool of claim 31, wherein the pivoting linkage includes a first link arm pivotably coupled to a second link arm, and the first end of the pivoting linkage is a proximal end of the first link arm, and the second end of the pivoting linkage is a distal end of the second link arm.

36. The flywheel driven fastening tool of claim 31, wherein the second end of the pivoting linkage includes an elongated slot, and a pin of the fastener driver extends into the elongated slot to couple the second end of the pivoting linkage to the fastener driver.

37. The flywheel driven fastening tool of claim 36, wherein the pivoting linkage comprises a single pivot arm including both the first end and the second end of the pivoting linkage.

* * * * *